United States Patent
Peng et al.

(10) Patent No.: US 7,237,900 B2
(45) Date of Patent: Jul. 3, 2007

(54) POLARIZATION CONVERSION SYSTEM

(75) Inventors: Ci Guang Peng, Chia-I (TW); Hsin Wen Tsai, Taipei Hsien (TW); Po Liang Chiang, Taipei (TW); Yi Wei Liu, Taipei Hsien (TW); Hsueh-Chen Chang, I-Lan Hsien (TW)

(73) Assignee: United Microdisplay Optronics Corp., Hsin-Chu (TW)

( * ) Notice: Subject to any disclaimer, the term of this patent is extended or adjusted under 35 U.S.C. 154(b) by 224 days.

(21) Appl. No.: 10/905,397

(22) Filed: Dec. 30, 2004

(65) Prior Publication Data

US 2006/0146288 A1  Jul. 6, 2006

(51) Int. Cl.
*G03B 21/14* (2006.01)
*G02B 6/10* (2006.01)
*F21V 9/14* (2006.01)

(52) U.S. Cl. .............................. 353/20; 353/81; 385/11; 362/19

(58) Field of Classification Search .................. 353/20, 353/28, 33, 81; 349/9, 57, 62; 362/19; 385/11, 385/33, 36

See application file for complete search history.

(56) References Cited

U.S. PATENT DOCUMENTS

| | | | | |
|---|---|---|---|---|
| 5,381,278 A * | 1/1995 | Shingaki et al. | ............. | 359/256 |
| 6,969,177 B2 * | 11/2005 | Li et al. | ....................... | 362/19 |
| 2001/0008470 A1 * | 7/2001 | Dewald | ..................... | 359/850 |
| 2002/0135874 A1 * | 9/2002 | Li | ............................... | 359/497 |
| 2003/0231262 A1 * | 12/2003 | Janssen | ......................... | 349/5 |
| 2004/0263789 A1 * | 12/2004 | Kim et al. | .................... | 353/20 |
| 2005/0174641 A1 * | 8/2005 | Greenberg et al. | .......... | 359/486 |

* cited by examiner

*Primary Examiner*—W. B. Perkey
*Assistant Examiner*—Andrew Sever
(74) *Attorney, Agent, or Firm*—Winston Hsu

(57) ABSTRACT

A polarization conversion system suited for LCD or LCoS-based projection applications is disclosed. The present invention polarization conversion system encompasses a light pipe with a rectangular light tunnel therein defined by four side reflection mirrors. A front reflection with an aperture thereon is mounted on an entrance face of the light pipe. A first polarization beam splitter is mounted on an exit face of the light pipe. A retardation plate, which is perpendicular to the exit face, is situated atop the first polarization beam splitter. A reflection mirror is situated atop the retardation plate. A second polarization beam splitter is mounted under the first polarization beam splitter and is opposite to the retardation plate.

7 Claims, 2 Drawing Sheets

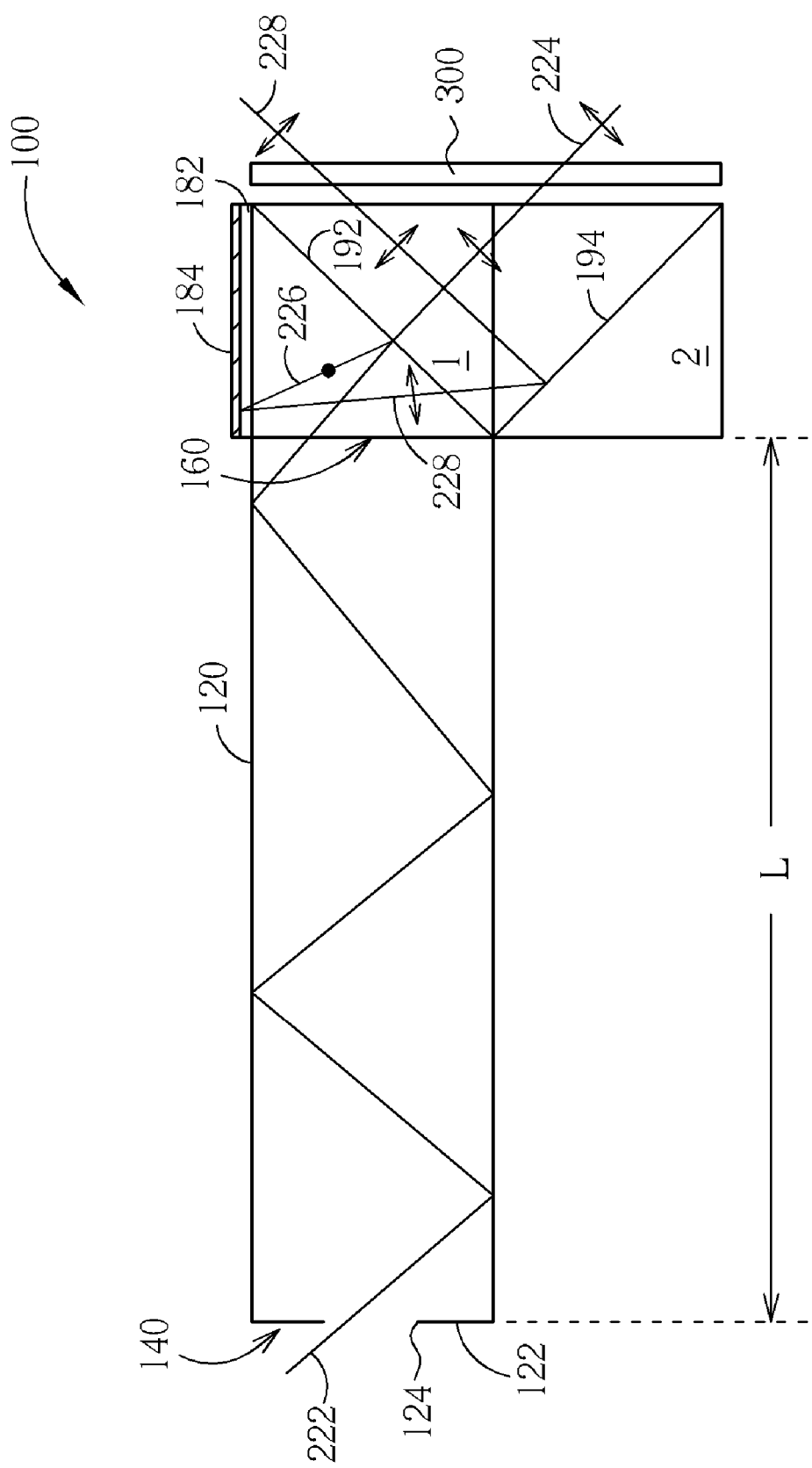

POLARIZATION CONVERSION SYSTEM

BACKGROUND OF INVENTION

1. Field of the Invention

The invention relates to an optical device utilized for light polarization conversion and more particularly, to a polarization conversion system utilized for LCD/LCoS projectors.

2. Description of the Prior Art

As is widely known, liquid crystal display (LCD) projectors and liquid crystal on silicon (LCoS) projectors commonly convert light sources via a light polarization conversion system to a relatively similar polarization state, such as a P polarization beam or an S polarization beam. Hence, the LCD projectors are also referred to as transmission projectors as they operate by transmitting the light beams through the LCD panels. LCoS projectors on the other hand, operate by reflecting light beams, and thus they are also referred to as reflective projectors.

Please refer to FIG. 1. FIG. 1 is a diagram showing the light polarization conversion system according to the prior art. As shown in FIG. 1, the light polarization conversion system 10 includes a light pipe 12 and a prism module 16 located on the entrance face 14 of the light pipe 12. The prism module 16 includes two triangular prisms 162 and 164 that are positioned at a 90-45-45 degree angle and includes a rhombus prism 166 in between. A polarization beam splitting (PBS) layer 168 is coated on the 45 degree angle face of the triangular prisms 162 and 164. A half-wave plate (HWP) 18 is also located between the entrance face 14 of the light pipe 12 and the rhombus prism 166.

After an unpolarized beam 22 enters through the triangular prism 162, the P polarization beam 24 will pass through the PBS layer 168 and travel directly into the light pipe 12. The S polarization beam 26 on the other hand will first reflect to the 45 degree PBS layer 168 of the triangular prism 164 via the PBS layer 168 and next reflect to the HWP 18. After the S polarization beam passes through the HWP 18, the polarization direction of its electrical field is turned to a 90 degree angle and becomes a P polarization beam 28 and finally enters the light pipe 12. By utilizing this method, the light beams are being polarized linearly to have an equal polarization state and after numerous reflections inside the light pipe 12, uniformized light beams are produced at the exit face of the light pipe 12.

SUMMARY OF INVENTION

It is therefore an objective of the present invention to provide an improved polarization conversion system.

According to the present invention, the polarization conversion system comprises a hollow light pipe with a rectangular light tunnel therein defined by four side reflection mirrors including a front reflection mirror with an aperture, in which the unpolarized light beams are directed from the aperture and through the light tunnel; a first polarization beam splitter situated in proximity to the entrance of the light tunnel wherein the first polarization beam splitter comprises a first polarization splitting surface located at a 45 degree angle that allows a first polarization beam of the unpolarized beam to pass through and reflects a second polarization beam of the unpolarized beam where the phase difference between the first polarization status and the second polarization status is 90 degrees; a retardation plate positioned on top of the polarization beam splitter; a reflection mirror positioned on top of the retardation plate, where after the second polarization beam enters the retardation plate, the polarization direction of the electric field is rotated by a phase θ/2 and after the second polarization beam reenters the retardation plate via the reflection mirror, the polarization direction of the electric field is rotated once more by the phase θ/2, and after the second polarization beam exits the retardation plate, the polarization direction of the electric field is rotated by a total phase θ; and a second polarization beam splitter located below the first polarization beam splitter wherein the second polarization beam splitter comprises a second polarization splitting surface corresponding to the 90 degree angle of the first polarization splitting surface and reflects the second polarization beam that passes through the retardation plate.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 2 is a diagram showing the polarization conversion system according to the preferred embodiment of the present invention.

DETAILED DESCRIPTION

Figure 1:
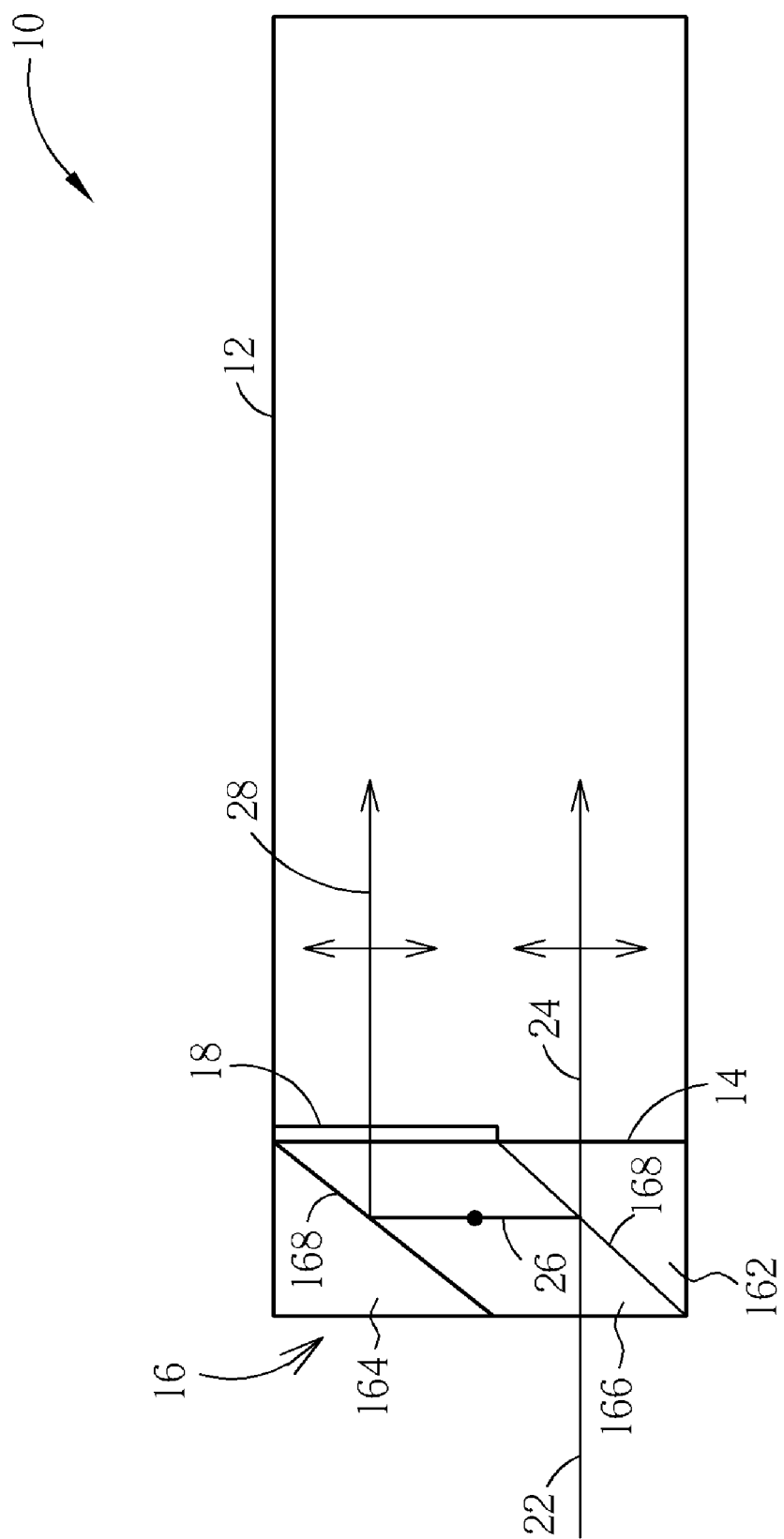
FIG. 1 is a diagram showing the light polarization conversion system according to the prior art.

Please refer to FIG. 2. FIG. 2 is a diagram showing the polarization conversion system 100 according the preferred embodiment of the present invention. As shown in FIG. 2, the polarization conversion system 100 includes a hollow light pipe 120 with length L, a rectangular light tunnel comprised of a plurality of side reflection mirrors, and a front reflection mirror 122 mounted on the entrance face 140 of the light pipe 120. The front reflection mirror 122 includes an aperture 124 that is capable of directing a light beam 222 of a light source (not shown) into the light tunnel.

A first polarization beam splitter 1 is located on the exit face 160 of the light pipe 120. The polarization beam splitter 1 includes a PBS face 192 that is located at a 45 degree angle. The polarization beam splitter 1 enables the P polarization beam 224 defined by the PBS face 192 to penetrate through the PBS face 192 and the S polarization beam 226 defined by the PBS face 192 to reflect.

The polarization beam splitter 1 can be a reflective polarizer or a polarization splitter module embedded with wire grids, such as the polarization splitter produced by Moxtek Inc, a polarization beam splitter, or a cubical prism covered with a PBS layer at its 45 degree angle face. Preferably, the polarization beam splitter 1 is a module that has a high light extinction ratio and a low reflection loss.

A retardation plate 182 is positioned on top of the polarization beam splitter 1 and a reflection mirror 184 is placed on the retardation plate 182. After the S polarization beam 226 enters the retardation plate 182 via the PBS face 192, the polarization direction of the electric field is rotated by a phase θ/2. The reflection mirror 184 then reflects the second polarization beam that enters the retardation plate 182 and re-rotates the polarization direction of the electric field by another phase θ/2. Hence the total rotation achieved is θ, in which θ is an approximate 90 degree angle. As a result, the S polarization beam 226 is converted to a P polarization beam 228 for passing through the PBS face 192 of the polarization beam splitter 1.

As shown in FIG. 2, a polarization beam splitter 2 is located below the polarization beam splitter 1. The polarization beam splitter 2 includes a PBS face 194 that is placed at a 45 degree angle corresponding to the PBS face 192. The polarization beam splitter 2 essentially enables the S polarization beam 226 defined by the PBS face 192 to pass through the PBS face 194 and the P polarization beam 228 defined by the PBS face 194 to reflect. Finally the polarization beams are passed to an LCD or LCoS panel via a lens group 300.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A polarization conversion system comprising:
a hollow light pipe with a rectangular light tunnel therein defined by four side reflection mirrors including a front reflection mirror with an aperture, in which the unpolarized beams are directed from the aperture and through the light tunnel;
a lens group situated in proximity to the exit of the light tunnel;
a first polarization beam splitter situated in proximity to the exit of the light tunnel wherein the first polarization beam splitter comprises a first polarization splitting surface located at a 45 degree angle that allows a first polarization beam of the unpolarized beam to pass through and reflect a second polarization beam of the unpolarized beam where the phase difference between the first polarization status and the second polarization status is 90 degrees, wherein the first polarization beam passes the lens group directly after passes through the first polarization splitting surface;
a retardation plate positioned on top of the polarization beam splitter;
a reflection mirror positioned on top of the retardation plate, where after the second polarization beam enters the retardation plate, the polarization direction of the electric field is rotated by a phase $\theta/2$ and after the second polarization beam reenters the retardation plate via the reflection mirror, the polarization direction of the electric field is rotated once more by the phase $\theta/2$, and after the second polarization beam exits the retardation plate, the polarization direction of the electric field is rotated by a total phase $\theta$; and
a second polarization beam splitter located below the first polarization beam splitter wherein the second polarization beam splitter comprises a second polarization splitting surface corresponding to the 90 degree angle of the first polarization splitting surface and reflects the second polarization beam that passes through the retardation plate.

2. The polarization conversion system of claim 1 wherein the unpolarized beam is reflected numerous times in the light tunnel via the aperture before entering the first polarization beam splitter.

3. The polarization conversion system of claim 1 wherein the retardation plate is a quarter wave plate.

4. The polarization conversion system of claim 1 wherein the first polarization beam splitter is a reflective polarization plate.

5. The polarization conversion system of claim 1 wherein the first polarization beam splitter is a cubical prism covered with a PBS layer.

6. The polarization conversion system of claim 1 wherein the second polarization beam splitter is a cubical prism covered with a PBS layer.

7. The polarization conversion system of claim 1, wherein the path of the second polarization beam comprises a first reflection, a second reflection with a phase shift, a pass through and a third reflection.

* * * * *